G. SCHLEUSSELBURG.
ALCOHOL STOVE.
APPLICATION FILED AUG. 28, 1915.

1,176,172.

Patented Mar. 21, 1916.
2 SHEETS—SHEET 1.

Witnesses
Chas. W. Stauffer
Karl H. Butler

Inventor
George Schleusselburg,
By
Bachtel & Bachtel
Attorneys

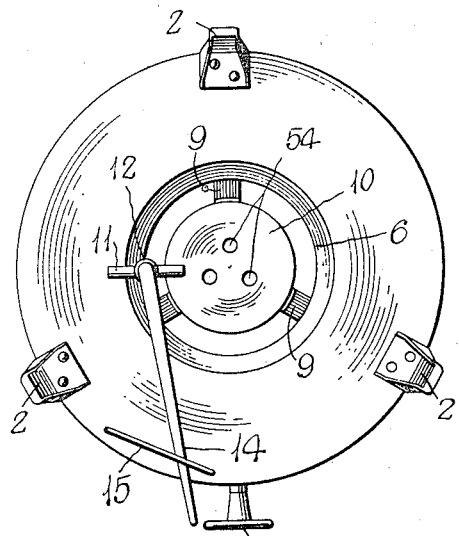
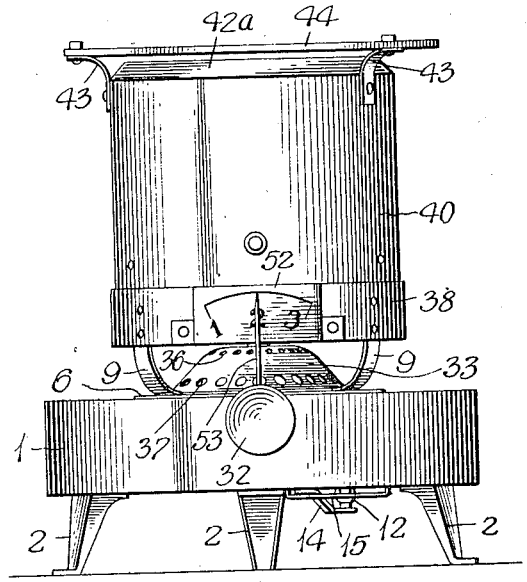
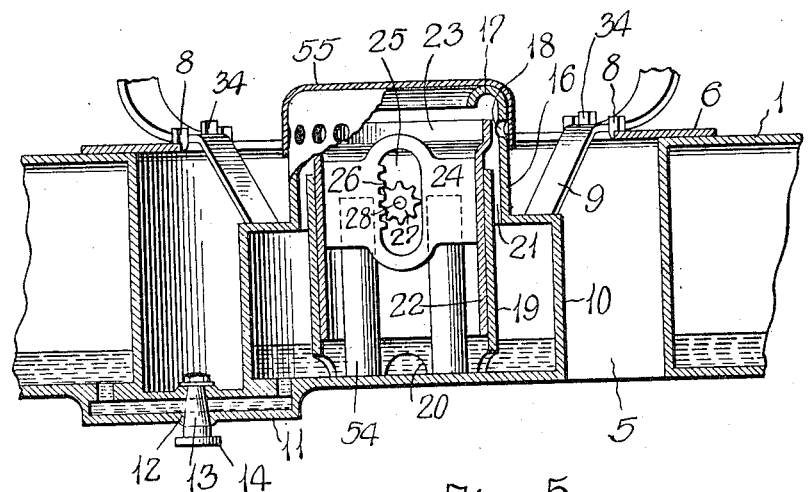

UNITED STATES PATENT OFFICE.

GEORGE SCHLEUSSELBURG, OF DETROIT, MICHIGAN.

ALCOHOL-STOVE.

1,176,172.  Specification of Letters Patent.  Patented Mar. 21, 1916.

Application filed August 28, 1915.  Serial No. 47,740.

*To all whom it may concern:*

Be it known that I, GEORGE SCHLEUSSELBURG, a subject of the Emperor of Germany, residing at Detroit, in the county of Wayne and State of Michigan, have invented certain new and useful Improvements in Alcohol-Stoves, of which the following is a specification, reference being had therein to the accompanying drawings.

This invention relates to alcohol stoves, and my invention aims to provide a compact stove structure wherein positive and reliable means are employed, in a manner as hereinafter set forth, for vaporizing alcohol, carbureting the vapor, and utilizing the mixture as a fuel for producing a flame of high caloric or thermal intensity. The uses of such a flame are many. For instance, the flame can be advantageously used when the stove structure is of such form as to be portable and adapted for cooking purposes or heating a small compartment. The same principle involved in a small stove structure may be involved in a large structure for heating purposes and as a substitute for furnaces and boilers.

My invention further aims to provide a stove in which wood alcohol can be safely used as a fuel and as a source of inflammable gas, which when properly mixed with air produces a smokeless and odorless combustion. Such a stove necessarily includes a burner and in the present instance the burner possesses characteristics indispensable for the control and ignition of vaporized alcohol. One characteristic of the burner is that of controlling the initial supply of air and the formation of the flame, both of which coöperate to increase the efficiency of alcohol as a heating medium.

My invention further aims to provide an alcohol stove with a novel combustion chamber including means for baffling a fuel flame to produce a blue flame of intense heat and disseminating such a flame to provide tongue flames which increase the heating area of the combustion chamber.

A stove possessing all of the above characteristics is constructed with a view of reducing the cost of manufacture and at the same time retain the features by which safety, durability, simplicity and ease of assembling are secured, and with such ends in view my invention resides in the novel construction, combination and arrangement of parts to be hereinafter specifically described and then claimed.

Reference will now be had to the drawings, wherein—

Figure 1:
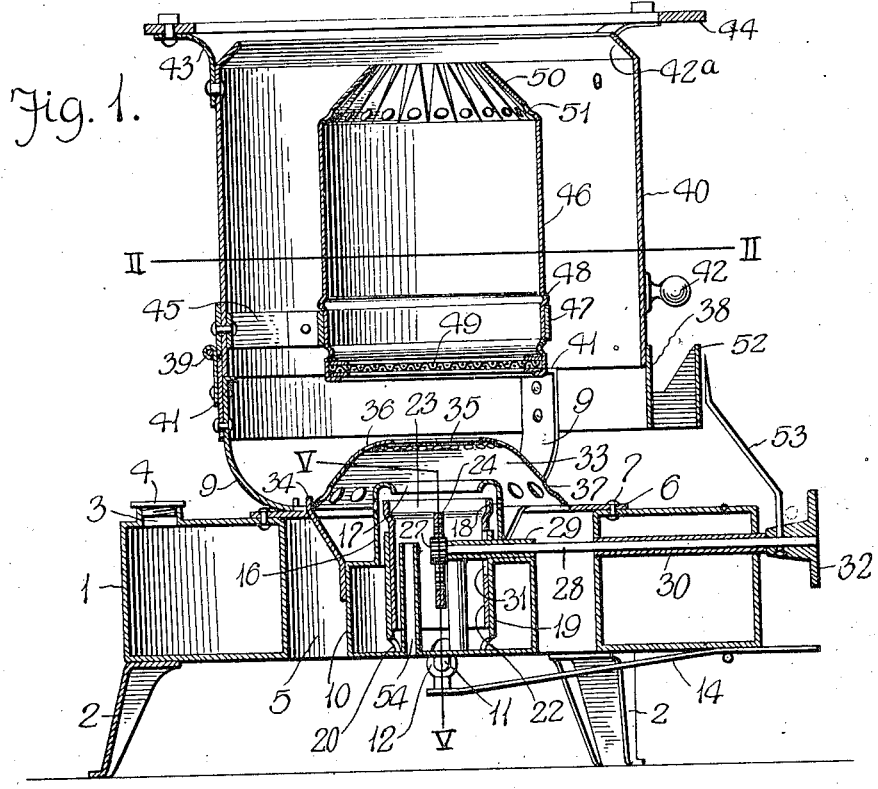
Figure 2:
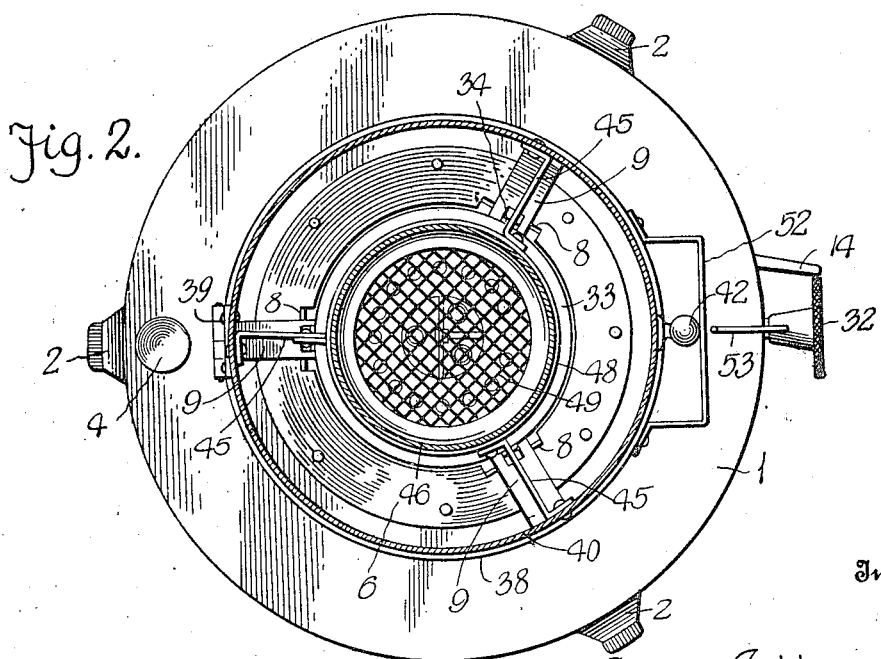

Figure 1 is a vertical sectional view of an alcohol stove in accordance with my invention; Fig. 2 is a horizontal sectional view taken on the line II—II of Fig. 1; Fig. 3 is a bottom plan of the stove on a smaller scale; Fig. 4 is a front elevation of the stove, and Fig. 5 is an enlarged cross sectional view of a portion of the stove, taken on or about the lines V—V of Fig. 1.

In describing my invention by aid of the views above referred to, I desire it to be understood that the same are merely illustrative of an example whereby my invention may be applied in practice, and I do not care to confine my invention to the precise construction shown. The following description is therefore to be broadly construed as including substitute constructions and arrangements of parts which are the obvious equivalents of those to be hereinafter referred to.

As I remarked at the outset, the shape of the stove may be varied considerably so long as enough air can be admitted for the supply of gas for which the stove is intended, and so long as there is adequate room between the air and vapor admission and the point of combustion to insure that intimate mixture of air with vapor to insure complete combustion. In the drawings, however, I represent that form of stove which I have practically tested, and which in practice gives the result to which my invention is directed—viz., the complete and, certainly so far as the senses indicate, an odorless and smokeless combustion.

In the drawings, 1 denotes an annular reservoir supported in a horizontal position by legs 2. The top of the reservoir has a filling opening 3 which permits of the reservoir being filled with wood alcohol or a similar fuel. The filling opening 3 is adapted to be normally closed by a plug or cap 4, and the conformation of the reservoir affords a central air passage 5.

6 denotes a flat ring riveted or otherwise connected to the top of the reservoir as at 7, and the inner wall of said ring is cut or sheared and the cut or sheared material struck up to provide positioning lugs 8 for combined supports and hangers 9. These hangers are preferably in the form of flat straps, three in number, disposed at 180 degrees apart relative to the vertical axis of the stove, and the lower ends of the hangers extend into the central air passage, while the upper ends of the hangers are curved outwardly and upwardly to provide supports.

10 denotes a cylindrical burner casing supported concentrically of the central air passage 5 by the hangers 9. The bottom of the burner casing 10 is connected to the bottom of the reservoir 1 by a conduit 11 establishing communication between the reservoir 1 and the burner casing 10 whereby the alcohol flows from the reservoir 1 into the burner casing. This conduit is best shown in Figs. 3 and 5 and in order to control the flow of alcohol through the conduit, said conduit has a valve body 12 for a ported valve plug 13. The lower end of the ported valve plug 13 has a fixed stem or lever 14 extending outwardly under the reservoir 1 and through a stirrup 15 carried by the bottom of the reservoir. This stirrup is adapted to frictionally hold the stem or lever against the bottom of the reservoir and prevents accidental shifting of the lever.

16 denotes a cylindrical burner in communication with the top of the burner casing 10, said cylindrical burner having the upper end thereof reamed or inturned to provide an annular deflector 17. The walls of the burner 16, contiguous to the deflector 17, have circumferentially disposed openings 18, which in starting the stove, serve as air inlet ports and eventually as flame outlet orifices.

19 denotes a cylindrical guide having a lower scalloped or apertured end 20 connected to the bottom of the burner casing 10, said cylindrical guide extending into the burner 16 and coöperating with the walls thereof in forming an annular flame passage 21. Slidable in the guide is a tubular valve 22 with the lower end thereof disposed to close the scalloped or apertured portions of the guide 19. The upper end of the tubular valve 22 is reamed or offset to form an annular shutter 23 in proximity to the openings 18 of the burner 16.

24 denotes a vertically disposed web connecting the walls of the tubular valve 22 and said web is provided with a vertically disposed opening 25 having an edge thereof formed to provide a rack 26. Meshing with the rack 26 is a pinion 27 mounted upon the inner end of a shaft 28, journaled in sleeves or bearings 29 and 30. The sleeve or bearing 29 is mounted on the top of the burner casing 10 and extends through the cylindrical guide 19 and a slot 31 provided therefor in the wall of the valve 22. This is best shown in Fig. 1. The sleeve or bearing 30 extends through the annular reservoir 1 and is supported by the walls thereof with the outer end of the shaft 28 protruding from the reservoir. Mounted on the outer end of the shaft 28 is a knurled button or hand piece 32 and by rotating the shaft 28, the tubular valve 22 can be raised and lowered within the guide 19.

33 denotes a frusto-conical shaped foraminous deflector resting upon the ring 6 over the burner 16. The lower edges of the deflector 33 are notched to receive upstruck lugs 34 of the hangers 9, said lugs correctly positioning the deflector and preventing accidental displacement thereof. The top of the deflector has a flame opening 35 and the walls of the deflector have two series of circumferentially disposed air inlet openings 36 and 37.

38 denotes an annular base riveted or otherwise connected to the upper ends of the hangers 9, said base being supported in a superposed horizontal plane relative to the reservoir 1. Connected to the base 38 by a hinge 39 is a tiltable main casing 40 which has the lower end thereof fitting in the base 38 and resting upon inturned ends or flanges 41 of the hangers 9. The main casing 40 has a knob or handle 42 to facilitate tilting or opening the casing relative to the base 38, and the upper end of the main casing has an inwardly projecting deflecting flange 42ª and brackets or knees 43 supporting a horizontal frame 44. It is upon this frame that a utensil can be placed to be heated by the stove.

45 denotes inwardly projecting arms connected to the main casing 40, adjacent the lower end thereof, said arms supporting a cylindrical combustion chamber 46 above the foraminous deflector 33. The combustion chamber 46 is frictionally held in a band 47 carried by the inner ends of the arms 45, said combustion chamber having an annular bead 48 resting upon said band. The lower end of the combustion chamber 46 is shaped to provide a seat or holder for a baffle 49 in the form of a horizontally disposed screen made of interwoven wire having interstices which permit of a flame or vaporized alcohol passing therethrough. This foraminous baffle performs an important function in the operation of the stove as will hereinafter appear. The upper end of the combustion chamber 46 is slitted and bent inwardly to provide a plurality of circumferentially arranged tongues 50, each of which is apertured at its base, as at 51. These tongues are adapted to disseminate a tubular flame into tongue flames which may impinge the bottom of a utensil or receptacle placed upon the frame 44.

52 denotes a dial plate carried by the base 38 and movable in front of this dial plate is a hand or pointer 53 carried by the knurled button 32 on the outer end of the shaft 28. The dial plate 52 has suitable designations to indicate three positions of the tubular valve 22, and with the outer end of the shaft 28 above and in close proximity to the outer end of the stem or lever 14, the operation of the stove can be easily controlled.

54 denotes air inlet tubes carried by the bottom of the burner casing 10 and extending upwardly into the tubular valve 22, said air tubes establishing communication between the atmosphere and the interior of the burner 16.

With the mechanical construction of the stove in mind, reference will now be had to the operation of the stove.

Assuming that the reservoir 1 has been filled with wood alcohol, the hand or pointer 53 is swung to the left and as the shaft 28 is rotated counterclockwise, the tubular valve 22 is lowered and practically closes the scalloped or apertured lower end 20 of the tubular guide 19. The stem or lever 14 is now shifted to partially open the communication between the reservoir 1 and the burner casing 10 and alcohol can flow through the conduit 11 into the burner casing. The main casing 40 is tilted back to facilitate lighting the stove and in some instances the deflector 33 can be removed. With this preparation, the hand or pointer 53 is moved slightly to the right, thereby elevating the annular valve 22 which allows a small quantity of alcohol to enter the guide 19 and this small quantity of alcohol can be safely ignited. The alcohol flame thus produced extends upwardly through the burner 16 and creates or produces a draft through the air inlet tubes 54 and the central air passage 5 of the reservoir. The air entering the burner 16 through the tubes 54 increases the intensity of the alcohol flame and air is drawn through the openings 18 of the burner, thus producing a suction in the passage 21 of the burner and such suction or reduction of atmospheric pressure above the alcohol of the casing 10 tends to raise the alcohol and vaporize the same. The alcoholic vapor impinges the deflector 17 and commingles with the air admitted by the tubes 54, thus increasing the volume of the flame. The vaporizing and carbureting of the alcohol having been accomplished the pointer or hand 53 is shifted to the right and the shaft 28 is moved clockwise to elevate the annular valve 22. In elevating the annular valve 22, the shutter 23 at the upper end of said valve divides the flame into two tubular flames, one of which is sustained by the alcoholic vapor and air in the tubular valve 22 and the other of which is sustained by the alcoholic vapor in the passage 21 and air passing upwardly through the central passage 5. The outer commingling of alcoholic vapor and air is of course ignited by reason of having primarily commingled with the initial flame and it is in this manner that an alcoholic flame is produced which may be correctly termed a "tubular" flame insomuch as it has the appearance of having been produced by a tubular wick.

The inner and outer flames of the burner are caused to unite into a single tubular flame by the foraminous deflector 33, this deflector further contributing to the carbureting of the alcoholic vapor and the flame emerges from the deflector 33 at the opening 35 thereof and impinges the baffle 49. At this baffle, the flame is retarded or thrown back to that extent that air passing under and in the lower end of the main casing 40 further contributes to the generation of an inflammable gas which is carried through the foraminous baffle into the combustion chamber 46, where it becomes ignited above the baffle and sustains a blue flame of high thermal intensity. This is incurred by the foraminous baffle 49 being heated to a cherry red by the flame below the baffle, consequently the air which passes in under the main casing 40 is heated as it passes through the baffle and thus increases combustion within the chamber 46. The blue flame within the combustion chamber assumes a tubular form by reason of the foraminous baffle 49 having a central heated portion with the inrush of air at the marginal edges of the heated portion, consequently a tubular flame is sustained within the combustion chamber 46 corresponding in diameter to the heated portion of the baffle 49. This tubular flame thoroughly heats the walls of the combustion chamber and any air passing upwardly through the main casing 40. The flame impinges the tongues 50 and is disseminated to that extent that air drawn upwardly between the combustion chamber 46 and the main chamber 40 is thoroughly heated before escaping into a compartment or room. It is therefore apparent that the stove, when constructed upon a small scale, can be advantageously used for cooking purposes or when constructed upon a large scale it serves functionally the same purpose as the best hot air furnace. It is also apparent that in the operation of the stove, the guide 19 and the tubular valve 22 constitutes an inner chamber which is initially heated and thereby causes a generation of alcoholic fumes or vapors in the burner casing 10, and the generation of such an inflammable gas is controlled by the raising and lowering of the annular valve 22.

To extinguish the flame and place the stove out of operation, the main casing 40 is tilted back, the deflector 33 removed and a snuffer 55 is placed over the upper end of the burner 16, thereby extinguishing the flame and preventing alcohol within the burner casing 10 from evaporating. The valve of the conduit 11 can be closed and the remainder of the stove restored to its inoperative condition.

In using methyl alcohol, wood-spirit, CH₄O, the percentage of carbon is very low and when vaporized and carbureted, it burns without giving off an odor or smoke and therefore can be advantageously used as a fuel when subjected to the process involved during the operation of my improved stove.

What I claim is:—

1. In an alcohol stove, the combination with a reservoir, and a burner, of hangers supported from said reservoir and adapted to support said burner, a base supported by said hangers, a tiltable casing carried by said base, a combustion chamber in said casing above said burner, and a baffle at the lower end of said combustion chamber.

2. In an alcohol stove, the combination with a reservoir, and a burner, of hangers supported from said reservoir and adapted to support said burner, a base supported by said hangers, a tiltable casing carried by said base and having an inturned upper edge, inwardly projecting arms carried by said casing, a combustion chamber supported by said arms above said burner, and a baffle at the lower end of said combustion chamber.

3. In an alcohol stove, the combination with a reservoir, and a burner, of hangers supported from said reservoir and adapted to support said burner, a base supported by said hangers, a tiltable casing carried by said base, inwardly projecting arms carried by said casing, a combustion chamber supported by said arms above said burner, inwardly projecting tongues at the upper end of said combustion chamber adapted to disseminate a flame, and a baffle at the lower end of said combustion chamber.

4. In an alcohol stove, the combination with a reservoir, and a burner, of hangers supported from said reservoir and adapted to support said burner, a base supported by said hangers, a tiltable casing carried by said base, a combustion chamber supported within said casing above said burner, a baffle at the lower end of said combustion chamber, and a foraminous deflector between said burner and said baffle.

5. In an alcohol stove, the combination with a reservoir, and a burner, of a ring on said reservoir, hangers on said ring supporting said burner, a base carried by said hangers, a tiltable casing carried by said base, inwardly projecting arms carried by said casing, a combustion chamber supported by said arms above said burner, inwardly projecting tongues at the upper end of said combustion chamber adapted to disseminate a flame, and a baffle at the lower end of said combustion chamber.

6. In an alcohol stove, the combination with a reservoir and a burner, of a ring on said reservoir, hangers on said ring supporting said burner, a base carried by said hangers, a tiltable casing carried by said base and having an inturned upper edge, inwardly projecting arms carried by said casing, a combustion chamber supported by said arms above said burner, inwardly projecting tongues on the upper end of said combustion chamber adapted to disseminate a flame, a baffle at the lower end of said combustion chamber, and a foraminous deflector supported by said ring between said burner and said baffle.

In testimony whereof I affix my signature in presence of two witnesses.

GEORGE SCHLEUSSELBURG.

Witnesses:
ANNA M. DORR,
KARL H. BUTLER.